United States Patent [19]

Gardyszewski

[11] 4,139,962
[45] Feb. 20, 1979

[54] UNSYMMETRIC, SHEET STOCK FISHING LURE

[76] Inventor: Joseph Gardyszewski, 12401 Gratiot, Saginaw, Mich. 48603

[21] Appl. No.: 782,776

[22] Filed: Mar. 30, 1977

[51] Int. Cl.² ............................................. A01K 85/04
[52] U.S. Cl. ......................................... 43/42.5; D22/29
[58] Field of Search ................... 43/42.5, 42.51, 42.52, 43/42.18; 222/27–29

[56] References Cited

U.S. PATENT DOCUMENTS

| | | | |
|---|---|---|---|
| D. 175,905 | 10/1955 | Petrasek et al. | 43/42.52 X |
| 1,770,003 | 7/1930 | Miller | 43/42.5 |
| 2,637,134 | 5/1953 | Davidson | 43/42.5 X |
| 2,889,657 | 6/1959 | Bowman | 43/42.5 X |
| 2,921,400 | 1/1960 | Kuhl | 43/42.52 X |

Primary Examiner—Ronald E. Suter

[57] ABSTRACT

A fishing lure comprising a unitary piece of sheet stock including a central sheet section and integral front and rear flange sheet sections, inclined at different angles relative to the central sheet section, extending in the same direction away from the central sheet section.

16 Claims, 7 Drawing Figures

UNSYMMETRIC, SHEET STOCK FISHING LURE

BACKGROUND OF THE INVENTION

This invention relates to a one-piece fishing lure and more particularly to an artificial fishing lure including a unitary piece of sheet stock having sections thereof angularly related relative to each other in a new and novel manner.

It is an object of the present invention to provide an artificial fishing lure which exhibits a new and novel action as it is moved through water.

It is another object of the present invention to provide a fishing lure having a one-piece body which has sections thereof angularly relative to each other in a new and novel manner.

Yet another object of the present invention is to provide a fishing lure comprising a one-piece body of sheet stock having a central sheet section integrally mounting, along one lateral edge thereof, longitudinally disposed front and rear flanges which extend transversely to the plane of the central sheet section and which are disposed on the same side of the plane of the central sheet section.

Still another object of the present invention is to provide a one-piece fishing lure of the type described including a central sheet section mounting, along one lateral edge thereof, longitudinally disposed flanges disposed at different angles relative to the plane of the central sheet section.

Other objects and advantages of the present invention will become apparent to those of ordinary skill in the art as the description thereof proceeds.

SUMMARY OF THE INVENTION

An artificial fishing lure comprising a central sheet section having a pair of longitudinally disposed longitudinally extending laterally outwardly converging, lateral edge portions along one lateral edge thereof; a pair of end sheet sections integral with the lateral edge portions and being inclined relative to the central sheet section; the end sheet sections being disposed on the same side of the plane of the central sheet section.

The present invention may more readily be understood by reference to the accompanying drawings in which.

DESCRIPTION OF THE PREFERRED EMBODIMENT

Figure 6:
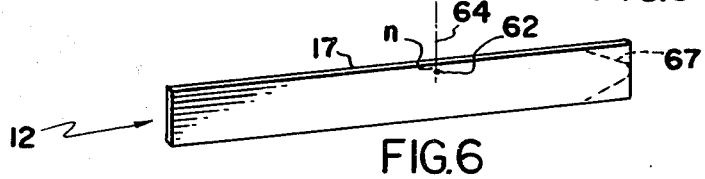
FIG. 6 is a perspective view of an initial blank of sheet stock utilized in constructing the fishing lure illustrated in FIGS. 1-5.

A fishing lure constructed according to the present invention is generally designated 10 and is formed from a single piece of sheet stock 12 (FIG. 6). The lure has a length 1 and includes a triangularly shaped, central planar sheet section 14 having a linear lateral side edge 16 and laterally outwardly converging, forward and rearward, lateral edge portions 18 and 20, respectively along the opposite lateral edge 17. Mounted on the forward and rearward edge portions 18 and 20 are planar, front and rear, flange or sheet sections 22, 24 respectively.

Figure 1:
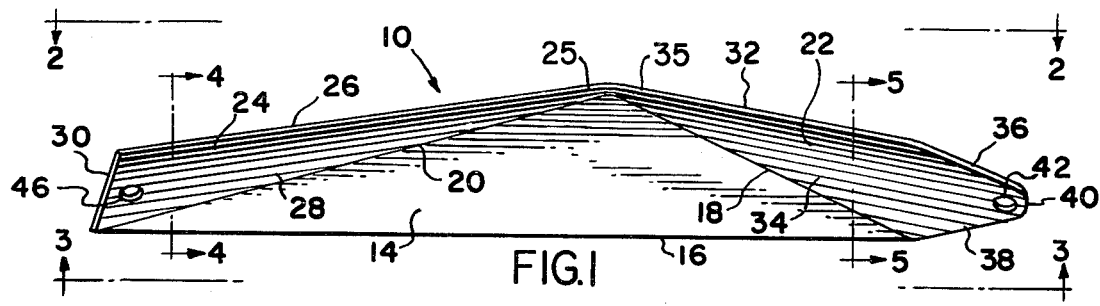
FIG. 1 is a top plan view of a fishing lure constructed according to the present invention.
Figure 2:
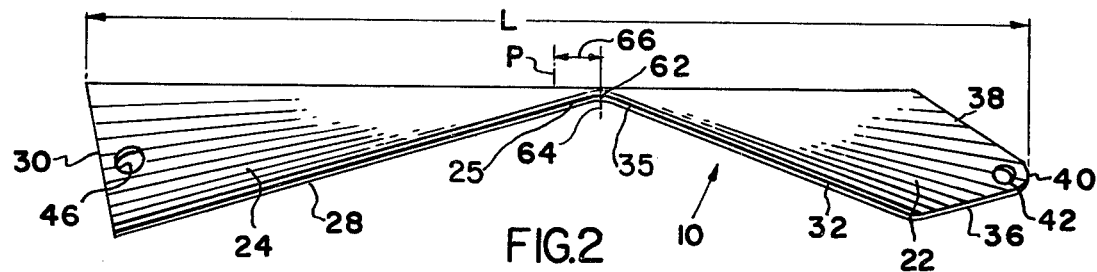
FIG. 2 is a side elevational view taken along the line 2—2 of FIG. 1.
Figure 3:
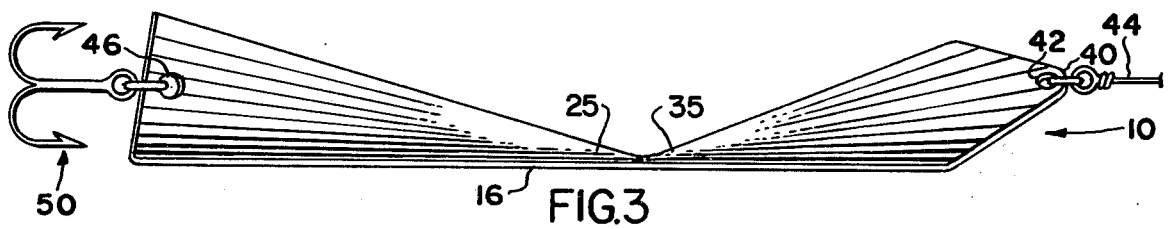
FIG. 3 is a laterally opposite view, taken along the line 3—3 of FIG. 1.
Figures 4, 5:
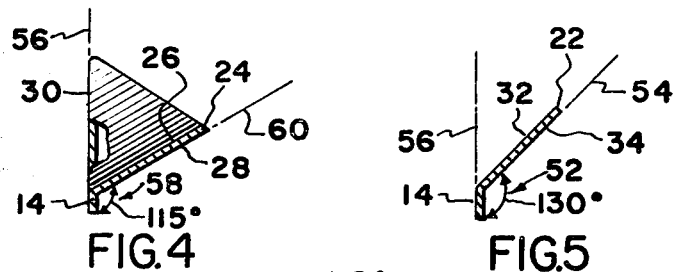
FIG. 4 is an end view, taken along the line 4—4 of FIG. 1, part of the rear flange being broken away to more clearly illustrate a portion of a central sheet section.
FIG. 5 is a sectional end view, taken along the line 5—5 of FIG. 1.

The rear flange section 24 is generally triangularly shaped and includes forwardly converging linear side edge portions 26 and 28 terminating in a forwardmost portion 25 and a trailing, transversely extending linear edge portion 30. The edge portion 28 is integral with the central sheet section edge portion 20. The forward sheet or flange section 22 includes a pair of forwardly diverging lateral edge portions 32 and 34 and a pair of forwardly disposed, forwardly converging edge portions 36 and 38 terminating in a curvilinear nose portion 40. The flange edge portion 34 is integral with the central sheet section edge portion 18. The lateral edge portions 32 and 34 converge rearwardly to a rearwardmost portion 35 which is joined to the forwardmost portion 25 on one side of the plane of the central sheet section 14, as illustrated in FIGS. 1, 2, 3.

An aperture 42 is provided in the nose portion 40 of the section 22 for attachment to a draft fishing line, generally designated 44. An aperture 46 is provided in the rear flange section 24 and mounts a fishing hook, generally designated 50. The included angle 52 between the plane 54 of the forward flange section 22 and the plane 56 of the central sheet section 14 is 130°. The included angle 58 between the plane 60 of the rear flange section 24 and the plane 56 of the central sheet section 14 is 115°. Accordingly, although each of the flange sections 22 and 24 is disposed on the same side of the central section plane 56, the included angle 52 between the forward flange plane 54 and the central sheet section plane 56 is greater than the included angle between the rearward flange plane 60 and the central section plane 56.

A transverse plane P, intersecting the longitudinal center of the lure, is equidistant between the ends of the lure. The planes 54 and 60 intersect in the plane 56 which is a distance 66 forwardly of the transverse plane P.

Figure 7:
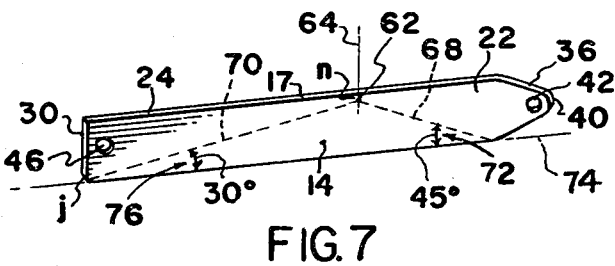
FIG. 7 is a perspective view, similar to FIG. 6, illustrating the blank in a subsequent stage of manufacture.

The lure is constructed from a sheet metal blank, generally designated 12 (FIG. 6). During an initial stage of manufacture, the blank 12 is mounted on a cutting die (not shown) which cuts the forward end of the blank 12 along the dotted line 67 (FIG. 6) to provide the forwardly converging surfaces 36, 38 and rounded nose 40. At the same time, the cutting die cuts or punches the line and hook mounting apertures 42 and 48 in the forward and rearward ends of the blank 12. The blank 12 is then placed in a triangularly shaped solid fixture (not shown) and the forward and rearward flange portions 22 and 24 are folded along the lines 68 and 70 (FIG. 7) relative to the central sheet section 14. The included angle 72 between the fold line 68 and a longitudinal lure axis 74 which lies in the plane 56 is illustrated as 45° in FIG. 7. The included angle between the fold line 70 and the longitudinal axis 74 is illustrated as 30°. The lines 68 and 70 intersect each other at a point 62 which lies in the plane 64 and is a slight distance n inwardly of the lateral edge 17.

The fold line 68 intersects the junction of lateral edge 16 and the edge portion 38. Although the fold line 70 is illustrated as intersecting the junction j and the lateral edge 16 and the trailing edge 30, the fold line 70 could also intersect the edge 16 forwardly of the junction j.

In operation, the lure 10 is cast into the water and then pulled through the water. The front and rear sheet section flanges 22 and 24, which are disposed at different angles relative to the central sheet section 14, will cause the lure to undulate and move through the water with a new and novel darting action that will attract fish to strike the lure. Upon striking the lure, the fish will be impaled on the hook 50. If desired, the angles 72 and 76 may be decreased and the angles 52 and 58 may be increased so that the lure will pass through the water with less resistance and the action or sidewise undulating movement will be less pronounced. It should be understood that the various dimensions and angles will change according to the thickness, width and length of the different lures.

If desired the central planar sheet section 14 and the front and rear sheet sections 22 and 24 could be curvilinear instead of being planar.

It is to be understood that the drawings and descriptive matter are in all cases to be interpreted as merely illustrative of the principles of the invention, rather than as limiting the same in any way, since it is contemplated that various changes may be made in various elements to achieve like result without departing from the spirit of the invention or the scope of the appended claims.

What I claim is:

1. An unsymmetrical artificial fish lure comprising:
   a one piece body or sheet stock including
      a longitudinally extending central sheet section having first and second lateral edges, one of said lateral edges including front and rear, longitudinally disposed, edge portions; and
      front and rear angularly related flange sections on only said front and rear edge portions, respectively, of said central sheet section;
   said front flange section being integral with said central sheet section and inclined relative thereto at a first predetermined angle;
   said front and rear sheet sections extending in the same general direction outwardly away from said central sheet section;
   said rear flange section being integral with said central sheet section and inclined relative thereto at an angle different than said first predetermined angle.

2. The lure as set forth in claim 1 wherein said central sheet section is joined to said front and rear flange sections at junctions which lie in intersecting planes, the intersection of said planes being forwardly of a transverse plane equidistant between the front and rear ends of said central sheet section.

3. The lure as set forth in claim 1 wherein said central sheet section comprises a triangularly shaped, planar sheet section, said front and rear flange sections comprising front and rear planar flange sections.

4. The lure as set forth in claim 1 wherein said front and rear flange sections converge laterally outwardly in a direction away from the other of said lateral edges.

5. The lure as set forth in claim 1 wherein said lateral edge portions along said one lateral edge converge laterally outwardly in a direction away from the other of said lateral edges, one of said edge portions being disposed at a predetermined angle relative to the longitudinal axis of said lure; the other of said edge portions being disposed at a lesser predetermined angle relative to said longitudinal axis.

6. The lure set forth in claim 1 wherein said central sheet section is triangularly shaped and includes a linear base edge defining the other of said lateral edges; said rear flange section is triangularly shaped and includes a linear base edge at the rearward end thereof and a pair of forwardly converging linear side edges, one of said linear side edges being coupled to said rear edge portion of said central sheet section, said forward flange including a second pair of forwardly diverging lateral side edges, one of said second pair of forwardly diverging lateral side edges being integrally coupled to said front edge portion of said central sheet section.

7. A one piece, unsymmetrical, artificial fishing lure comprising:
   a longitudinally extending central sheet section, lying in a predetermined plane, having first and second lateral edges, one of said edges including a pair of longitudinally extending, lateral edge portions, said edge portions converging laterally outwardly in the plane of said central sheet section in a direction away from the other of said lateral edges; and
   first and second end sheet sections provided on only said lateral edge portions and being inclined in the same direction relative to the plane of said central sheet section;
   said first and second end sheet sections being disposed on the same side of the plane of said central sheet section.

8. The lure as set forth in claim 7 wherein the included angle between one of said first and second end sheet sections and said central sheet section is greater than the included angle between the other said first and second end sheet sections and said central sheet section.

9. The lure as set forth in claim 7 wherein said first and second sheet sections lie in second and third predetermined planes; said first sheet section includes aperture in the forward end thereof; and said second sheet section includes a fish hook mounting aperture for mounting a fish hook, said first section including forwardly converging lateral edges; said second section including rearwardly diverging lateral edges terminating in a transversely extending, linear trailing edge.

10. The lure as set forth in claim 9 wherein the planes of said first, second, and central sections each intersects the other at a common location forwardly of the longitudinal center of said central sheet section.

11. The lure as set forth in claim 10 wherein the included angle between said first sheet section and said central sheet section is substantially equal to 135° and the included angle between said second sheet section and said first sheet section is substantially equal to 120°.

12. The lure as set forth in claim 7 wherein one of said lateral edge portions is disposed at a first predetermined angle relative to the longitudinal axis of said lure and the other of said edge portions is disposed at a lesser predetermined angle relative to said longitudinal axis.

13. An unsymmetrical fishing lure comprising:
   a unitary piece of sheet stock having a longitudinal axis including
      a longitudinally extending central sheet section having first and second lateral edges, one of said edges including front and rear longitudinally disposed lateral edge portions; converging laterally outwardly in a direction away from the other of said lateral edges;
      one of said edge portions being disposed at a first predetermined angle relative to said longitudinal axis;

the other of said edge portions being disposed at a lesser predetermined angle relative to said longitudinal axis; and a pair of end flange sections, integral with said central section, provided on only said front and rear edge portions respectively;

said flange sections extending transversely, angularly away from said central section and being disposed on the same side of the plane of said central section.

14. An unsymmetrical one piece fishing lure comprising:

a blank having forward and rearward ends, including:

a longitudinally extending, intermediate sheet section, lying in a predetermined plane;

a forward sheet portion on only one lateral side of a forward portion of said intermediate section, said forward portion being bent in a first direction relative to said intermediate portion along a first diagonal bend line; and a rearward sheet portion on only said one lateral side of a rearward portion of said intermediate sheet section, said rearward portion being bent in said first direction relative to said intermediate portion along a second diagonal bend line.

15. The lure set forth in claim 14 wherein said forward sheet portion includes lateral sides which rearwardly converge to a rearwardmost portion; said rearward sheet portion including lateral sides which converge forwardly to a forwardmost portion; said forwardmost portion being joined to said rearwardmost portion on one side of said predetermined plane.

16. An unsymmetrical, one piece fishing lure comprising:

a blank including:

a longitudinally extending central sheet section generally lying in a predetermined plane including a base along one lateral edge thereof and first and second edge portions, along the opposite lateral edge, converging outwardly in a direction away from said one lateral edge;

forward and rearward sheet sections, bent in the same general direction relative to said plane, provided only on said first and second lateral edge portions respectively;

said forward sheet section being disposed on one side of said plane including lateral sides which rearwardly converge to a rearwardmost portion;

said rearward sheet section being disposed on said one of said plane and including lateral sides which forwardly converge to a forwardmost portion;

said forwardmost portion of said rearward sheet section being joined to said rearwardmost portion of said forward sheet section on said one side of said plane.

* * * * *